US012756032B2

(12) United States Patent
Grass et al.

(10) Patent No.: US 12,756,032 B2
(45) Date of Patent: Oct. 6, 2026

(54) MOTOR VEHICLE TRACTION BATTERY MODULE

(71) Applicant: Dr. Ing. h.c. F. Porsche Aktiengesellschaft, Stuttgart (DE)

(72) Inventors: Dominik Grass, Bietigheim-Bissingen (DE); Markus Göhring, Nufringen (DE); Oliver Steiner, Lehrensteinsfeld (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 590 days.

(21) Appl. No.: 18/244,948

(22) Filed: Sep. 12, 2023

(65) Prior Publication Data

US 2024/0088479 A1 Mar. 14, 2024

(30) Foreign Application Priority Data

Sep. 14, 2022 (DE) ..................... 10 2022 123 460.6

(51) Int. Cl.
*H01M 10/6557* (2014.01)
*H01M 10/625* (2014.01)
(Continued)

(52) U.S. Cl.
CPC ..... *H01M 10/6557* (2015.04); *H01M 10/625* (2015.04); *H01M 10/647* (2015.04);
(Continued)

(58) Field of Classification Search
CPC ........... H01M 10/625; H01M 10/6557; H01M 10/647; H01M 10/651; H01M 10/6567; H01M 10/613; H01M 2220/20
See application file for complete search history.

(56) References Cited

U.S. PATENT DOCUMENTS 9,780,421 B2 10/2017 Palanchon et al.
10,847,850 B2 11/2020 Choi
(Continued)

FOREIGN PATENT DOCUMENTS

DE 102020124376 A1 4/2021
EP 1701404 A1 9/2006
(Continued)

OTHER PUBLICATIONS

The decision of KPO to grant a Patent for Application KR.20230120231 (Year: 2025).*

(Continued)

*Primary Examiner* — Alexander Usyatinsky
(74) *Attorney, Agent, or Firm* — Buchanan Ingersoll & Rooney PC

(57) ABSTRACT

A motor vehicle traction battery module having an inherently rigid battery housing, in which a plurality of plate-shaped pouch battery cells are arranged parallel to one another. A plate-shaped cooling structure for direct cooling of the pouch battery cells by a cooling liquid is arranged between two adjacent pouch battery cells. The cooling structure, which is compressible in the transverse direction and perpendicular to its plate plane, includes a plurality of inherently rigid trench bodies, each having a trench opening. The trench bodies alternately face with their respective trench openings the one pouch battery cell and the other pouch battery cell of the two adjacent pouch battery cells in such a way that the respective pouch battery cell is directly cooled by a cooling liquid flowing in the respective trench body.

10 Claims, 2 Drawing Sheets

(51) Int. Cl.

| | |
|---|---|
| ***H01M 10/647*** | (2014.01) |
| ***H01M 10/651*** | (2014.01) |
| ***H01M 10/6567*** | (2014.01) |
| *H01M 10/613* | (2014.01) |

(52) U.S. Cl.
CPC ..... *H01M 10/651* (2015.04); *H01M 10/6567* (2015.04); *H01M 10/613* (2015.04); *H01M 2220/20* (2013.01)

(56) References Cited

U.S. PATENT DOCUMENTS

| | | | | |
|---|---|---|---|---|
| 11,387,502 | B2 | 7/2022 | Shimizu et al. | |
| 2011/0052960 | A1* | 3/2011 | Kwon | H01M 10/0481 429/120 |
| 2011/0189525 | A1 | 8/2011 | Palanchon et al. | |
| 2011/0281145 | A1* | 11/2011 | TenHouten | H01M 10/613 429/50 |
| 2012/0183823 | A1* | 7/2012 | Von Borck | H01M 10/441 429/81 |
| 2014/0099527 | A1* | 4/2014 | Seong | H01M 50/291 429/120 |
| 2015/0333382 | A1* | 11/2015 | Mingers | H01M 50/24 429/120 |
| 2019/0267682 | A1 | 8/2019 | Seo et al. | |
| 2019/0337402 | A1* | 11/2019 | Günther | B60L 50/66 |
| 2021/0104793 | A1 | 4/2021 | Parkanzky et al. | |
| 2021/0143492 | A1* | 5/2021 | Zagrodnik | B60L 50/60 |
| 2022/0158273 | A1* | 5/2022 | Khateeb Razack | B32B 15/043 |
| 2022/0407167 | A1* | 12/2022 | Kellner | H01M 10/613 |
| 2023/0187763 | A1 | 6/2023 | Kellner et al. | |

FOREIGN PATENT DOCUMENTS

| | | | |
|---|---|---|---|
| EP | 3570364 | A1 | 11/2019 |
| GB | 202313967 | * | 4/2026 |
| WO | 2020224856 | A1 | 11/2020 |

OTHER PUBLICATIONS

Great Britain Search Report for Application No. GB2313967.8, dated Feb. 21, 2024. (2 pages).

* cited by examiner

MOTOR VEHICLE TRACTION BATTERY MODULE

CROSS-REFERENCE TO RELATED APPLICATION

This application claims priority to German Patent Application No. 10 2022 123 460.6, filed Sep. 14, 2022, the content of such application being incorporated by reference herein in its entirety.

FIELD OF THE INVENTION

The invention relates to a liquid-cooled automotive traction battery module having an inherently rigid battery housing.

BACKGROUND OF THE INVENTION

Motor vehicle traction battery modules are so-called high-voltage battery modules with terminal voltages of up to over 1000 V. In order to be able to realize permanently high electrical power output both during charging and during discharging of the traction battery module, the traction battery module must have an internal liquid cooling system. From US 2011 0 189 525 A1, EP 1 701 404 A1, WO 2020 224 856 A1, US 2011 0 052 960 A1, and DE 10 2020 124 376 A1, which are each incorporated by reference herein, various motor vehicle traction battery modules having an internal liquid cooling system are known, in which a plurality of plate-like battery cells are installed in an inherently rigid battery housing. The internal liquid cooling is realized by a plate-shaped cooling structure through which a cooling liquid flows, which is arranged in each case between two plate-shaped battery cells.

The so-called pouch battery cells are often used as the battery cells, which, due to their simpler cell structure, have a high electrical efficiency, low manufacturing costs, a high service life, and a high internal thermal conductivity. However, pouch battery cells naturally exhibit significant volume growth over their lifetime.

SUMMARY OF THE INVENTION

The motor vehicle traction battery module, according to aspects of the invention, is a so-called high-voltage traction battery module with a terminal voltage in the high-voltage range of well over 100 V to over 1000 V. The traction battery module comprises an inherently rigid and crash-resistant battery housing, preferably a metal battery housing. Within the battery housing, a plurality of plate-shaped pouch battery cells are arranged parallel to one another. In the present case, a pouch battery cell is understood to mean not necessarily a particular type of cell defined physically or chemically, but rather any type of cell that expands significantly during operation, in particular during heating and/or aging. A plate-shaped cooling structure is provided between two adjacent pouch battery cells for active and direct liquid cooling of the two adjacent pouch battery cells. In order to give the pouch battery cells space for their expansion, the plate-shaped cooling structure is configured so as to be compressible in the transverse direction and perpendicular to the base plane of the cooling structure or the base plane of the plate-shaped pouch battery cells.

The plate-shaped cooling structure comprises a plurality of inherently rigid trench bodies, each having a trench opening, wherein the trench bodies alternately face with their respective trench openings the one pouch battery cell and the other pouch battery cell of the two adjacent pouch battery cells in such a way that the respective pouch battery cell is directly cooled by a cooling liquid flowing in the respective trench body. Thus, the cooling liquid flows directly along and wets the surface of the pouch battery cell in question. In this way, an optimal heat transport or heat transfer is realized. The trench body is inherently rigid and thus does not deform upon expansion of the pouch battery cells.

With the trench body arranged alternately in relation to the one battery cell and to the other battery cell, not a full surface cooling but a strip-wise direct cooling of the respective battery cell is realized. For example, the cooling liquid can be a suitable cooling oil that is electrically non-conductive.

The cooling structure comprises a resilient trench body tensioning means, which biases the respective inherently rigid trench body in the transverse direction against the cooled pouch battery cell and is supported on the other adjacent pouch battery cell. The elastic trench body tensioning means thus ensures that the trench body is pushed towards the side wall or surface of the respective pouch battery cell as fluid-tightly as possible, so that a substantially fluid-tight cooling channel is defined.

A resiliently compressible spacer is provided between two adjacent trench bodies, by means of which spacer the two trench bodies, of which one is functionally and spatially assigned to the one battery cell and the other is functionally and spatially assigned to the other battery cell, are spaced laterally apart from one another so that the trench bodies do not overlap. Due to the lateral offset of the adjacent trench bodies, they can be moved into the same plane upon a strong expansion of the two adjacent battery cells without colliding with one another.

The spacer is compressible so as not to significantly impede an expansion of the two adjacent battery cells in this region.

In principle, the trench body tensioning means can be configured as an inherently resilient solid body. However, preferably, the trench body tensioning means is formed from a plurality of individual, inherently resilient spring elements, which are particularly preferably leaf-like in configuration. Cooling liquid can flow or stand between the spring elements. In this way, a certain level of heat transport and compensation can take place on the surface of a battery cell in the region between two of these associated trench bodies. The spring elements can be formed as a trench body and can be inclined counter to the direction of flow of the cooling liquid such that the spring elements are pushed towards the relevant surface of the battery cell on which they merely rest due to the flow of the coolant.

Preferably, the trench body tensioning means closes the space between the trench body and the adjacent pouch battery cell such that no significant flow of the cooling liquid results here.

Preferably, the spacer is formed from a resiliently compressible spacer solid body, which spaces the two directly adjacent trench bodies laterally from one another and also fluidly isolates them.

Preferably, the trench depth in the transverse direction is at most 80% of the spacer depth in the transverse direction. Thus, at least about 50% of the distance between two new adjacent pouch battery cells is available for their, for example, age-related expansion in the transverse direction.

Preferably, the trench body consists of a metal. Particularly preferably, this can be an extruded profile, for example from aluminum.

Particularly preferably, each trench body defines two cooling liquid trenches separated by a respective central web. A certain width of the cooling strip formed by the trench body is thereby realized, wherein however the trench body demonstrates a high structural stability.

BRIEF DESCRIPTION OF THE DRAWINGS

An exemplary embodiment of the invention will be explained in further detail in the following with reference to the figures.

DETAILED DESCRIPTION OF THE INVENTION

Figure 1:
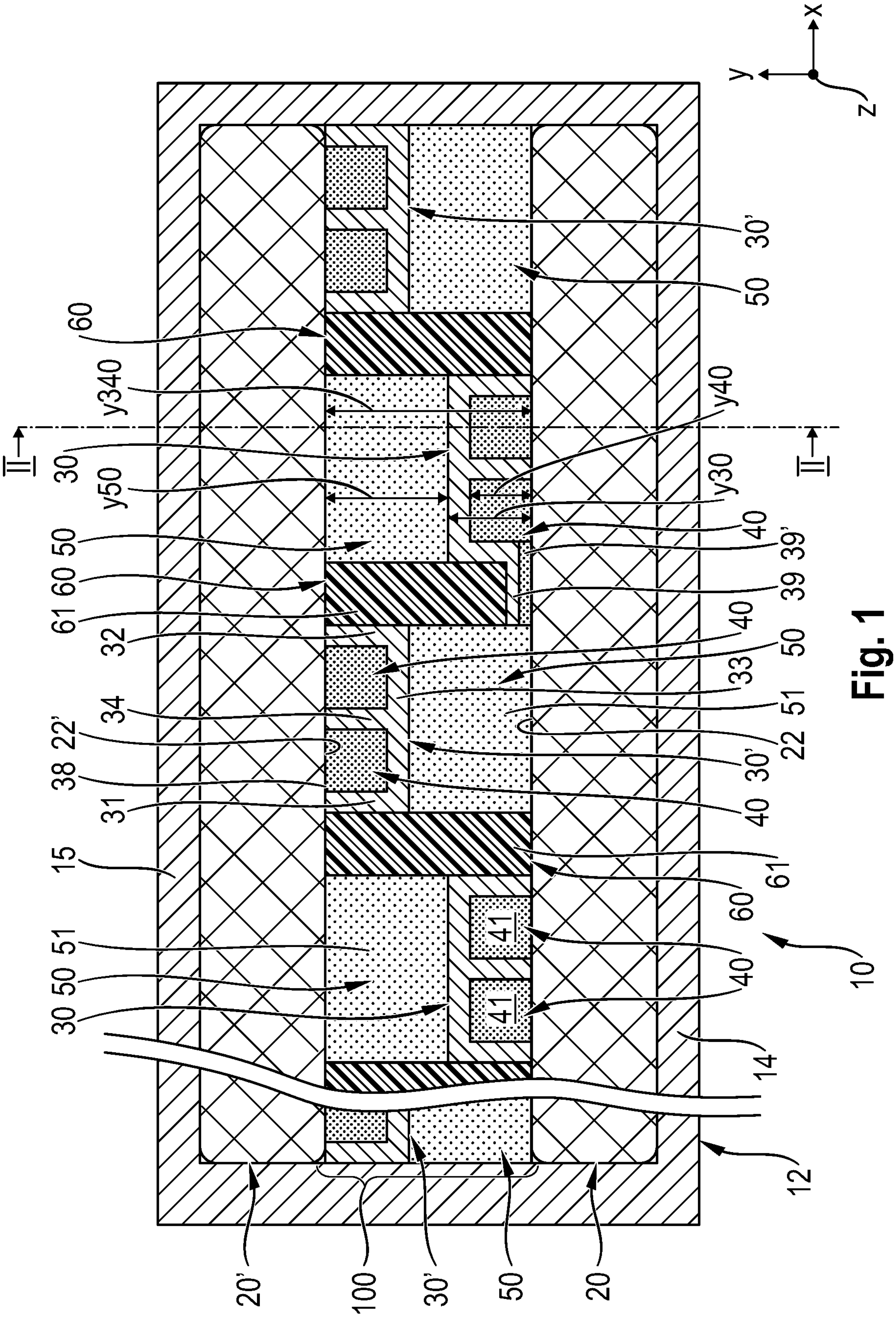
FIG. 1 depicts a schematic longitudinal section of a motor vehicle traction battery module according to the invention.

FIG. 1 shows a schematic longitudinal section of a motor vehicle traction battery module 10, which is a high-voltage battery module having a clamp voltage of, for example, approximately 800 V. In the present case, the traction battery module 10 is only shown schematically, such that in the present case, only two plate-shaped pouch battery cells 20, 20' are shown in an inherently rigid and crash-resistant metal battery housing 12, by way of example.

However, based on the residual tension of a pouch battery cell 20, 20', a corresponding plurality of pouch battery cells are installed in a traction battery module 10. For example, six or eight pouch battery cells can be combined into a cell stack in the battery housing.

Figure 2B:
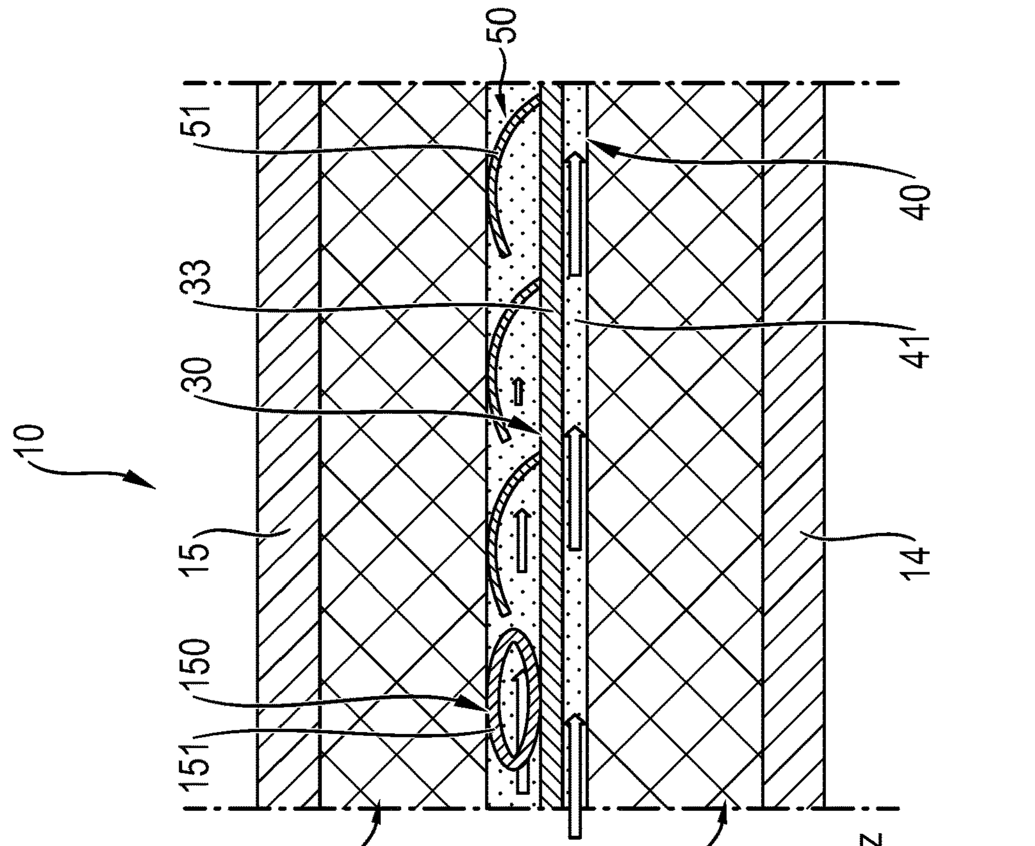
FIGS. 2*a* and 2*b* depict a respective cross section II-II of the traction battery module of FIG. 1 with non-expanded and expanded pouch battery cells.
Figure 2A:
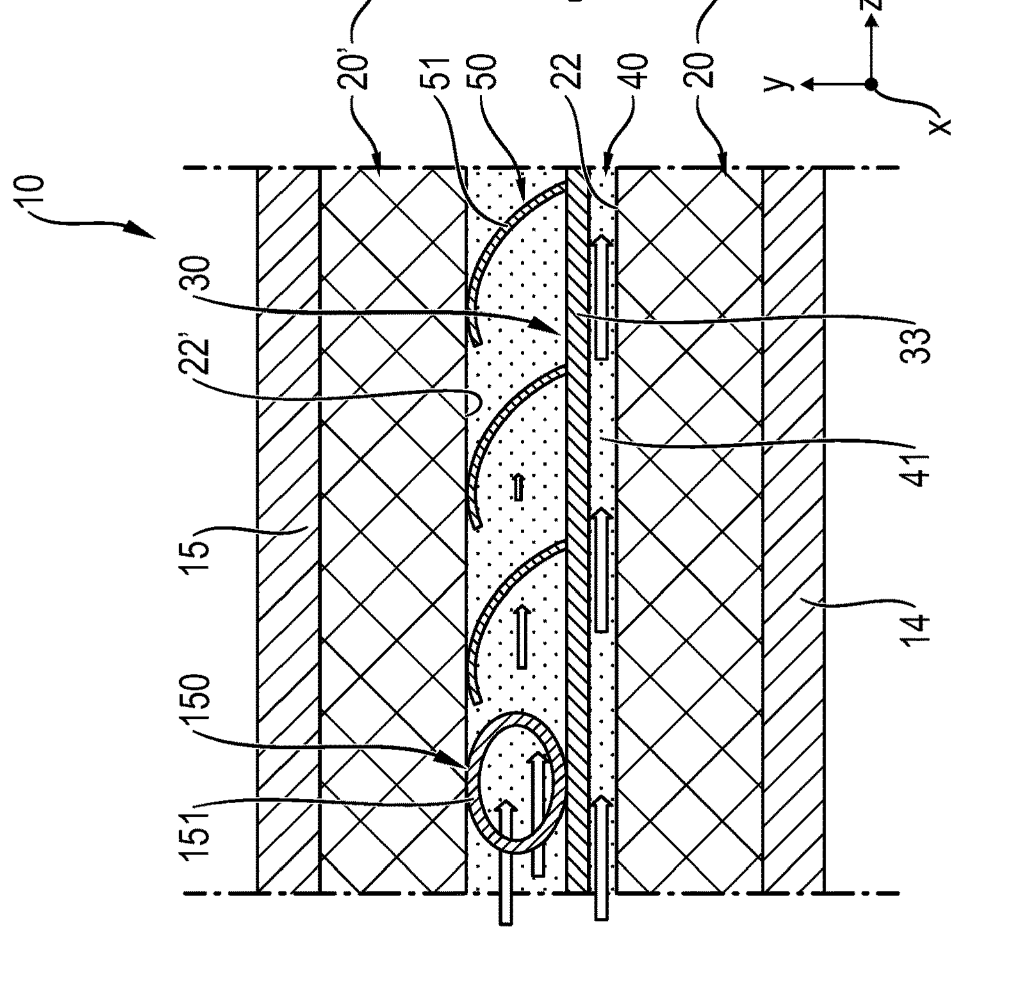

The plate-shaped pouch battery cells 20, 20' lie parallel to one another in a plate plane XZ, are identical to one another, and can expand significantly upon heating and by aging in the transverse direction Y, which is shown in FIG. 2*b*. A plate-shaped cooling structure 100 is arranged between the two pouch battery cells 20, 20', with which structure a side wall 22, 22' of each battery cell 20, 20' is cooled in strips directly by a flowing cooling liquid 41. In the present case, the cooling liquid 41 is an electrically non-conductive cooling oil.

The battery housing 12 comprises two metal side walls 14, 15, which are large in area and parallel to one another and, with their wall planes, lie parallel to the plate planes XZ of the battery cells 20, 20' and the plate-shaped cooling structure 100. The cooling structure 100, which is compressible in the transverse direction Y, consists substantially of a plurality of inherently rigid metal trench bodies 30, 30', each having two trench openings 38 and a corresponding number of trench body tensioning means 50; 150, wherein each tensioning means 50; 150 presses a respective trench body 30, 30' in the transverse direction towards a side wall 22, 22' of a pouch battery cell 20, 20' and is supported on the side wall 22', 22 of the adjacent pouch battery cell 20', 20, and a plurality of elastic compressible spacers 60, wherein one spacer 60 is arranged between two adjacent trench bodies 30, 30', so that the two adjacent trench bodies 30, 30' are held laterally spaced from one another by the spacer 60.

Each trench body 30, 30' is rectangular and, when viewed in the transverse plane XY, has an M-shaped structure and, when viewed in the transverse plane XY, has a bottom web 33 and perpendicular thereto two side webs 31, 32 and a central web 34. In this way, each trench body 30, 30' forms two cooling liquid trenches 40 that are parallel to one another.

The trench body 30, 30' abuts the respective side wall 22, 22' of the respective battery cell 20, 20' in such a way that the side wall 22, 22' fluid-tightly seals the two trench openings 38 of the two cooling liquid trenches 40. The respective side wall 22, 22' is thus directly liquid-cooled by the cooling liquid 41 in the region of the trench openings 38.

The spacers 60 are formed by a resiliently compressible plastic spacer solid body 61.

The inherently resilient trench body tensioning means 50; 150 can be formed in a variety of ways. In one embodiment, the trench body tensioning means 50 is formed from a plurality of individual, inherently resilient and leaf-like spring elements 51. In an alternative embodiment, the trench body tensioning means 150 is formed by tubular straining elements 151. The inherently resilient trench body tensioning means 50, 150 abuts the central web 34 of the trench body 30, 30', the side wall 22, 22' of the adjacent battery cell 20, 20', and the two adjacent spacers 60 in a largely fluid-tight manner so that a significant flow of the cooling liquid in this region is not possible.

As shown in FIG. 2*b*, upon an expansion of the battery cells 20, 20' in the transverse direction Y, the trench body tensioning means 50; 150 and the spacers 60 are compressed in the transverse direction. However, the trench bodies 30, 30' are not deformed, so that the cooling liquid flow through the cooling liquid trenches 40 always remains constant.

As shown in FIG. 1, for a new traction battery module 10, the trench depth Y40 of the cooling flow trench 40 in the transverse direction Y is approximately 60% of the spacer depth Y50. The trench body depth Y30 is approximately 40% of the cell spacing and the cooling structure depth Y340, respectively.

The trench body 30 can optionally have a lateral channel wall 39 that is parallel to a plate plane XY and through which a lateral connection channel 39 is formed, in order to thus establish pressure balance between all cooling liquid trenches 40.

What is claimed is:

1. A motor vehicle traction battery module comprising:

a battery housing, a plurality of pouch battery cells arranged parallel to one another within the battery housing, each of the pouch battery cells being plate-shaped, and a cooling structure for direct cooling of the pouch battery cells by a cooling liquid, the cooling structure being arranged between two pouch battery cells of the plurality of pouch battery cells, wherein the cooling structure is plate-shaped and compressible in a transverse direction (Y) that is perpendicular to a plane (XZ) of the cooling structure, wherein the cooling structure includes a plurality of trench bodies, each trench body including a trench having a trench opening, wherein the trench opening of one of the trench bodies is positioned to face one of the two pouch battery cells, and said one of the two pouch battery cells is configured to be cooled by cooling liquid within said one of the trench bodies, wherein the trench opening of another one of the trench bodies is positioned to face the other of the two pouch battery cells, and said other of the two pouch battery cells is configured to be cooled by cooling liquid within said another one of the trench bodies, wherein the cooling structure includes a resilient trench body tensioner, which (i) biases said one of the trench bodies in the transverse direction (Y) against said one of the two pouch battery cells and (ii) is supported on said other of the two pouch battery cells, and wherein the cooling structure includes a resiliently compressible spacer, which is positioned between and spaces apart in a lateral direction (X), said one of the trench bodies and said another one of the trench bodies.

2. The motor vehicle traction battery module according to claim 1, wherein the trench body tensioner is formed from a plurality of individual, resilient spring elements.

3. The motor vehicle traction battery module according to claim 2, wherein the spring elements are configured in a leaf-like manner.

4. The motor vehicle traction battery module according to claim 1, wherein the trench body tensioner fluid-tightly seals the space between said one of the trench bodies and said other of the two pouch battery cells.

5. The motor vehicle traction battery module according to claim 1, wherein the spacer is formed from a resiliently compressible spacer solid body.

6. The motor vehicle traction battery module according to claim 1, wherein a depth of the trench, as measured in the transverse direction (Y), is at most 80% of a depth of the spacer depth, as measured in the transverse direction (Y).

7. The motor vehicle traction battery module according to claim 1, wherein the trench body comprises metal.

8. The motor vehicle traction battery module according to claim 1, wherein each trench body defines two respective cooling liquid trenches that are separated apart from one another by a central web.

9. A traction battery comprising the traction battery module of claim 1.

10. A motor vehicle comprising the traction battery of claim 9.

* * * * *